May 8, 1928.                      K. WALL                    1,668,992
VEHICLE DIRECTION SIGNAL
Filed Feb. 24, 1926
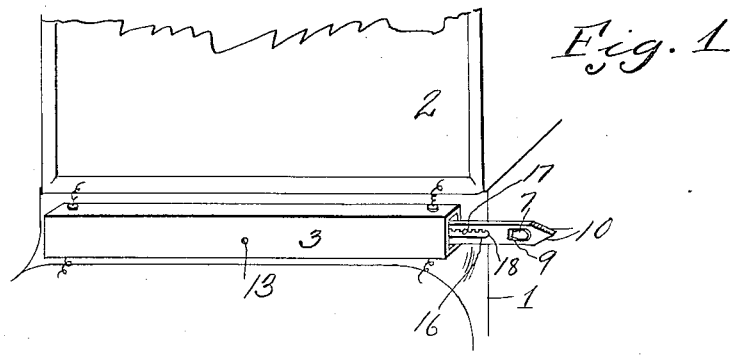
Fig. 1
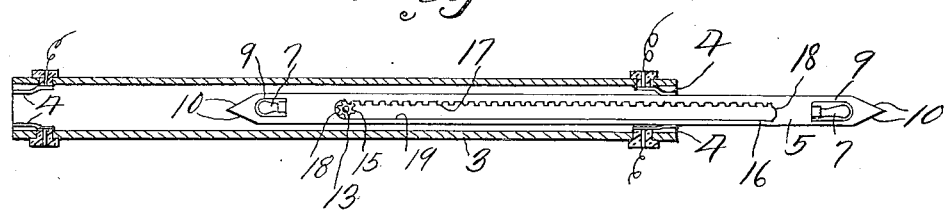
Fig. 2
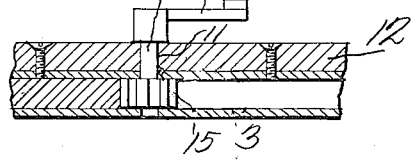
Fig. 3
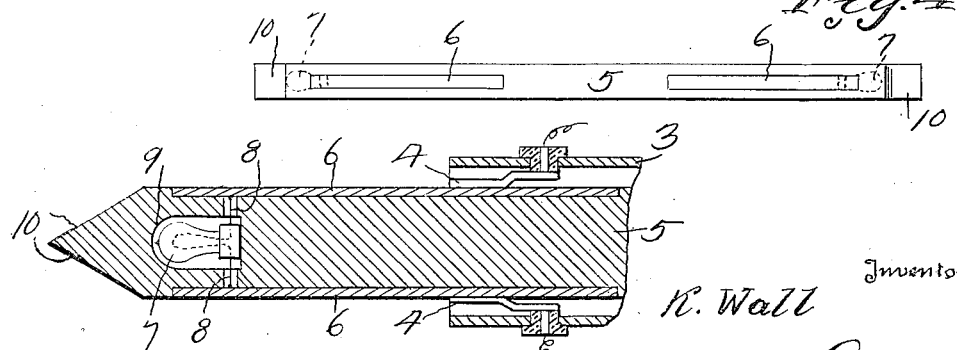
Fig. 4
Fig. 5
Inventor
K. Wall
By Philip A. H. Sewell
Attorney Patented May 8, 1928.

1,668,992

UNITED STATES PATENT OFFICE.

KATHERINE WALL, OF OMAHA, NEBRASKA.

VEHICLE DIRECTION SIGNAL.

Application filed February 24, 1926. Serial No. 90,334.

The invention relates to vehicle direction signals and has for its object to provide a device of this character comprising an elongated casing transversely disposed and secured to the forward side of the automobile body, forwardly of the windshield and having its end open. A pointer slidably mounted within said casing and supported by contact members when outwardly projected and by a centrally disposed rotatable gear within the casing, and which gear cooperates with a longitudinally disposed rack carried by the pointer.

A further object is to provide the pointer member with a longitudinally disposed recess, the upper side of which is provided with a gear rack, with which the rotatable gear meshes and to proportion said recess whereby the lower side thereof will engage the lower side of the gear teeth and maintain the gear in mesh with the rack and the ends of the recess will cooperate with the gear for limiting the outward movement of the pointer in either direction.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a perspective view of a portion of a conventional form of automobile, showing the direction signal applied thereto.

Figure 2 is a vertical longitudinal sectional view through the signalling device.

Figure 3 is a horizontal sectional view through the central portion of the signalling device.

Figure 4 is a top plan view of the pointer.

Figure 5 is a vertical longitudinal sectional view through one end of the pointer and the casing.

Referring to the drawing, the numeral 1 designates a conventional form of automobile, and 2 the windshield thereof. Secured to the forward portion of the automobile 1 forwardly of the windshield 2 is a horizontally and transversely disposed casing 3, which casing is rectangular shaped in vertical cross section. Secured within the open ends of the casing 3 are spring contact arms 4 which slidably engage the upper and lower sides of the elongated pointer 5 when either end of said pointer is projected to the right or left for a signalling operation. The spring contact members 4 engage conductor plates 6 carried by the upper and lower sides of the arm 5, and which contact plates are in circuit with the electric lamps 7 through the medium of the conductor wires 8, and which lamps are disposed in recesses 9 of the pointer ends. It will be noted that the outer ends of the pointer are bevelled as at 10, and when the pointer is forced outwardly in either direction, the bevelled surfaces will engage the spring contact arms 4 and spread the same to a position where they will engage the conductor plates 6. It will also be noted when the pointer is extended in either direction for indicating a right or left turn, the outer end of the pointer will be supported by the spring contact arms, which will not only form circuit closing means, but will also prevent rattling of the device within the casing 3.

Extending transversely through the casing 3 and rotatably mounted in a bearing 11 of the instrument board 12 of the automobile is a shaft 13, the inner end of which is provided with a crank 14 adapted to be grasped by the operator for rotating the shaft 13 in any desired direction. Shaft 13 is provided with a gear 15 within the casing, which gear is disposed in an elongated opening 16 in the pointer 5 and meshes with a rack 17 carried by the upper side of said opening, therefore it will be seen that when the gear 15 is rotated in either direction the arm 5 may be forced outwardly from the open ends of the casing according to the direction of rotation of the gear. The outward movement of the ends of the arms 5 is limited by the engagement of the gear 15 with the ends 18 of the opening 16, therefore it will be seen that the ends of the opening form limiting means for limiting the movement of the signalling arm 5. The lower side 19 of the opening 16 engages the outer faces of the gear 15, and maintains said gear 15 in mesh with the rack 17 at all times, thereby obviating the necessity of special guiding or holding means for the gear.

From the above it will be seen that a vehicle direction signalling device is provided which is extremely simple, the parts reduced to a minimum and one wherein the operating gear at all times supports the inner end of the pointer thereby preventing rattling of the inner end of the pointer within the casing and the spring contact members 4 support the outer end of the pointer, and by providing the elongated opening 16 the bottom 19 and the ends 18 of which cooperate with the gear 15, the movement of the arm 5 is limited in its movement in either direction and the gear 15 maintained in mesh at all times.

The invention having been set forth what is claimed as new and useful is:—

1. A vehicle direction signal comprising a transversely disposed elongated casing having its opposite side open, an elongated signalling arm disposed in said casing, a transversely disposed operating shaft, said operating shaft extending transversely through an elongated opening in the signalling arm, a gear carried by said shaft and disposed in the opening of the arm, a rack carried by the upper side of the opening of the arm and with which the gear meshes, the ends of said opening cooperating with opposite sides of the gear for limiting the outward movement of the arm in either direction, said gear engaging the lower side of the opening during the movement of the arm whereby said gear will be maintained in mesh with the rack.

2. The combination with a vehicle direction signal comprising a casing having a signalling arm slidably mounted therein and adapted to be extended from opposite ends of said casing, of means for moving said arm, said means comprising a gear disposed in an elongated opening of the arm, a rack within said arm and with which the gear meshes, the ends of the opening cooperating with opposite sides of the gear for limiting the outward movement of the arm, one side of the opening engaging the gear opposite the rack and forming means for maintaining the gear in mesh with the rack.

In testimony whereof I affix my signature.

KATHERINE WALL.